UNITED STATES PATENT OFFICE.

NANCY KATE GENTRY, OF DENVER, COLORADO.

COSMETIC CREAM.

SPECIFICATION forming part of Letters Patent No. 395,824, dated January 8, 1889.

Application filed March 13, 1888. Serial No. 267,107. (No specimens.)

*To all whom it may concern:*

Be it known that I, NANCY KATE GENTRY, a citizen of the United States of America, residing at Denver, in the county of Arapahoe and State of Colorado, have invented a certain new and useful Composition of Matter for a Remedial Cosmetic or Cream, of which the following is a specification.

My invention relates to a new and useful composition of matter for use as a cosmetic cream or unguent and possessing therapeutic qualities fitting and adapting it for employment not only as a mere cosmetic for preserving and softening the skin, but also for use as a healing salve or unguent or ointment with cuts, burns, sores, chaps, &c.

My composition of matter consists of the following ingredients, combined in about or substantially about the proportions noted: twelve ounces of olive-oil, six ounces of bleached beeswax, one-half dram gum-camphor, six drams of carbolic acid of ninety-five per cent. strength, four ounces of glycerine, one-half ounce of saturated tincture of fresh flowers of calendula, one-half dram of borax, and two drams of oil of bay.

To make a thoroughly good article great care should be exercised in seeing that these ingredients are perfectly pure and clean, that the vessels used in mixing are clean, and that the greatest cleanliness is maintained all through the operation of mixing and combining. To properly combine the ingredients noted the olive-oil, wax, camphor, and carbolic acid are melted and thoroughly mixed together. When thoroughly melted and mixed, the composition is taken from the fire or source of heat for melting and the glycerine added and stirred in. Next, the tincture of calendula flowers and the borax dissolved in a small quantity of hot water are added and stirred in, so as to be thoroughly incorporated. Lastly, the oil of bay and a half dram or sufficient quantity of other suitable perfume are stirred in. The composition is now complete, and to give it the proper blandness, smoothness, creaminess, and lightness it should be thoroughly and rapidly beaten or whipped until quite cold. Thus prepared this composition forms a beneficial cosmetic for softening and preserving the skin, and preventing tanning and wrinkles. At the same time it possesses such therapeutic and healing qualities that it forms a very effective and purifying ointment or salve for burns, cuts, sores, &c.

Having described my invention, what I claim is—

The herein-described composition of matter for a remedial cosmetic or cream, consisting of olive-oil, beeswax, gum-camphor, carbolic acid, glycerine, tincture of calendula flowers, and oil of bay, in the proportions substantially as set forth.

In testimony whereof I affix my signature in presence of two witnesses.

NANCY K. GENTRY.

Witnesses:
Z. F. WILBER,
JOHN ROBARDS.